(No Model.) 2 Sheets—Sheet 1.

R. W. JONES.
Bridle Bit.

No. 241,141. Patented May 10, 1881.

Attest: Inventor:
Richard W. Jones

N. PETERS, Photo-Lithographer, Washington, D. C.

(No Model.) 2 Sheets—Sheet 2.

R. W. JONES.
Bridle Bit.

No. 241,141. Patented May 10, 1881.

Attest:
Jm Lynch
W. R. Pardee

Inventor:
Richard W. Jones.

UNITED STATES PATENT OFFICE.

RICHARD W. JONES, OF SYRACUSE, NEW YORK.

BRIDLE-BIT.

SPECIFICATION forming part of Letters Patent No. 241,141, dated May 10, 1881.

Application filed March 25, 1881. (No model.)

*To all whom it may concern:*

Be it known that I, RICHARD W. JONES, a citizen of the United States, residing at Syracuse, in the county of Onondaga and State of New York, have invented certain new and useful Improvements in Bridle-Bits and in the Manufacture thereof; and I do hereby declare that the following specification is a full, clear, and exact description of the invention, which, taken in connection with the accompanying drawings, will enable others skilled in the art to which it appertains to make and use the same.

My invention relates to a new and improved bit the bar of which is constructed of half-round metal, and in a new and improved method of constructing the same.

Figure 1:
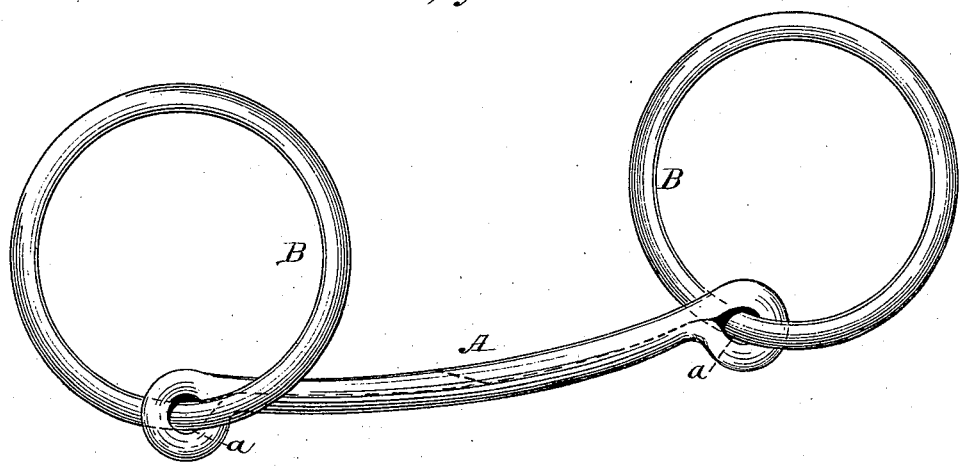
Figure 2:
Figure 3:
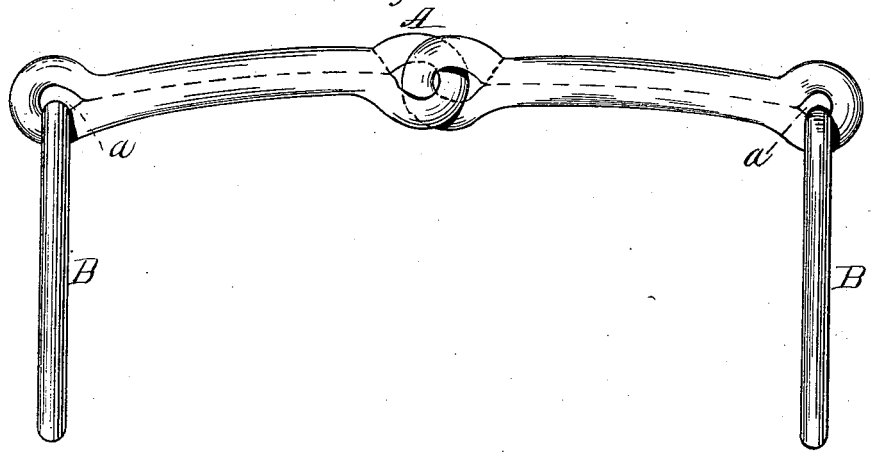
Figure 4:
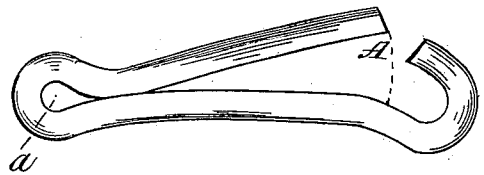

In the accompanying drawings, Figure 1 is a perspective view of a completed bar-bit. Fig. 2 is a side elevation of the same partially completed and ready to be welded or brazed. Fig. 3 is a front elevation of a snaffle-bit. Fig. 4 is a detail view of one of the sections composing the snaffle-bar.

Similar letters of reference denote like parts in the views.

A represents the bar of the bit. B B are the rings, and *a a* are eyes formed, as will be hereinafter described, and adapted to encircle the rings or check-pieces.

In the construction of my improvement I take a piece of half-round metal of the proper length and thickness, and after having leveled or scarfed the ends I bend it in reverse directions around the rings or check-pieces, the bends being at such points that the scarfed or beveled ends will come near the center of the bar, where they are hammered together, and the joint shown in dotted lines in Fig. 1 is then welded or brazed by any of the ordinary methods.

I sometimes make the bar in blank, substantially as shown in Fig. 2, forming the eyes over a piece of iron approximately the size of the rings or check-pieces to be used, and then insert the rings or check-pieces before welding. I am thus enabled to make the parts separately, and rapidly assemble them before welding or brazing.

The beveled ends may be formed by cutting the blanks for the bar from a rod of metal at an angle, thus producing the blanks from which the bar is to be formed without the slightest waste of material, as will be readily apparent.

I have shown bits provided with the ordinary rings; but I do not propose to confine myself to the use of rings, as I can use a straight bar or curb without departing from my invention, it only being necessary, when straight bars are used, to provide such bars with annular grooves or shoulders, and even these are not essential, as the welding, if properly done, will hold all the parts securely.

For cheap bits I use a good quality of half-round iron, but for one requiring finer finish steel is used.

When it is desired to construct a bar that will be extremely light or one that will be tubular when completed, so that it may contain water or medicaments, I use hollow or semi-tubular metal, instead of the solid semi-cylindrical bar.

After the parts are united by welding or brazing the bit is tinned or plated by any of the known methods.

Thus far I have described my improvement as applied to a bar-bit; but the same principle of construction is equally applicable to a bit with a jointed mouth-piece, as shown by Figs. 3 and 4. In this form of bit two sections pivoted together are used to form the bar, instead of one, as in the bar-bit, the sections being provided with eyes at each of their ends, and either before or after they are hooked together and brazed or welded the eyes forming the hinge or snaffle are twisted one-quarter of the way round, so that a better joint is formed.

By my improvement I construct a bit that is easily made, and with the joint at or near the center of the bar, where there is the least strain, and I am thus enabled to produce strong and durable bits with the least possible quantity of material and at less cost than any with which I am acquainted.

Having thus fully described my invention, what I claim as new, and desire to secure by Letters Patent, is—

1. A bridle-bit in which the bar-pieces consist of half-round metal bent substantially as described, and welded or brazed at or near the center of the bar, as set forth.

2. That improvement in the method of constructing bridle-bits from half-round metal which consists in bending the blank for the mouth-piece over upon itself from each end, forming the eyes over a ring or mandrel, and welding or brazing the flat surfaces and end laps, whereby a substantially solid mouth-piece is obtained, all substantially as set forth.

In witness whereof I have hereunto set my hand this 26th day of February, 1881.

RICHARD W. JONES.

Witnesses:
  JNO. S. LYNCH,
  W. F. PARDEE.